(12) United States Patent
Dabney et al.

(10) Patent No.: US 7,320,223 B1
(45) Date of Patent: Jan. 22, 2008

(54) SYSTEM FOR CONTROLLING CHILD SAFETY SEAT ENVIRONMENT

(75) Inventors: Richard W. Dabney, Tanner, AL (US); Susan V. Elrod, Huntsville, AL (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 597 days.

(21) Appl. No.: 11/047,343

(22) Filed: Jan. 28, 2005

(51) Int. Cl.
*F25B 21/02* (2006.01)

(52) U.S. Cl. .......................... 62/3.3; 62/3.61; 62/244; 62/261

(58) Field of Classification Search .................... 62/3.3, 62/3.5, 3.61, 244, 261
See application file for complete search history.

(56) References Cited

U.S. PATENT DOCUMENTS

| | | | |
|---|---|---|---|
| 1,475,912 A | 11/1923 | Williams | |
| 2,978,972 A | 4/1961 | Hake | |
| 3,030,145 A | 4/1962 | Kotteman | |
| 3,136,577 A | 6/1964 | Richard | |
| 4,273,375 A | 6/1981 | Kobayashi | |
| 4,413,857 A | 11/1983 | Hayashi | |
| 4,572,430 A | 2/1986 | Takagi et al. | |
| 4,923,248 A | 5/1990 | Feher | |
| 4,946,220 A | 8/1990 | Wyon et al. | |
| 5,002,335 A | 3/1991 | Bengtsson | |
| 5,002,336 A | 3/1991 | Feher | |
| 5,016,302 A | 5/1991 | Yu | |
| 5,117,638 A | 6/1992 | Feher | |
| 5,354,117 A | 10/1994 | Danielson et al.1 | |
| 5,370,439 A | 12/1994 | Lowe et al. | |
| 5,382,075 A | 1/1995 | Shih | |
| 5,385,382 A | 1/1995 | Single, II et al. | |
| 5,516,189 A | 5/1996 | Ligeras | |
| 5,524,439 A | 6/1996 | Gallup et al. | |
| 5,597,200 A | 1/1997 | Gregory et al. | |
| 5,626,021 A | 5/1997 | Karunasiri et al. | |
| 5,626,386 A | 5/1997 | Lush | |
| 5,715,695 A | 2/1998 | Lord | |
| 5,897,162 A | 4/1999 | Humes et al. | |
| 5,902,014 A | 5/1999 | Dinkel et al. | |
| 5,921,858 A | 7/1999 | Kawai et al. | |
| 5,924,766 A | 7/1999 | Esaki et al. | |

(Continued)

FOREIGN PATENT DOCUMENTS

JP       2003116665 A   *   4/2003

*Primary Examiner*—Marc Norman
(74) *Attorney, Agent, or Firm*—James J. McGroary; Peter J. Van Bergen

(57) ABSTRACT

A system is provided to control the environment experienced by a child in a child safety seat. Each of a plurality of thermoelectric elements is individually controllable to be one of heated and cooled relative to an ambient temperature. A first portion of the thermoelectric elements are positioned on the child safety seat such that a child sitting therein is positioned thereover. A ventilator coupled to the child safety seat moves air past a second portion of the thermoelectric elements and filters the air moved therepast. One or more jets coupled to the ventilator receive the filtered air. Each jet is coupled to the child safety seat and can be positioned to direct the heated/cooled filtered air to the vicinity of the head of the child sitting in the child safety seat.

30 Claims, 3 Drawing Sheets

U.S. PATENT DOCUMENTS

| | | |
|---|---|---|
| 5,924,767 A | 7/1999 | Pietryga |
| 5,927,817 A | 7/1999 | Ekman et al. |
| 5,934,748 A | 8/1999 | Faust et al. |
| 6,059,018 A | 5/2000 | Yoshinori et al. |
| 6,062,641 A | 5/2000 | Suzuki et al. |
| 6,079,485 A | 6/2000 | Esaki et al. |
| 6,079,781 A | 6/2000 | Tilley |
| 6,106,057 A | 8/2000 | Lee |
| 6,127,655 A | 10/2000 | Humes et al. |
| 6,164,719 A | 12/2000 | Rauh |
| 6,179,706 B1 | 1/2001 | Yoshinori et al. |
| 6,186,592 B1 | 2/2001 | Orizaris et al. |
| 6,189,966 B1 | 2/2001 | Faust et al. |
| 6,254,179 B1 | 7/2001 | Kortum et al. |
| 6,273,810 B1 | 8/2001 | Rhodes, Jr. et al. |
| 6,478,369 B1 | 11/2002 | Aoki et al. |
| 6,505,886 B2 | 1/2003 | Gielda et al. |
| 2001/0028185 A1 | 10/2001 | Stowe et al. |
| 2002/0011071 A1 | 1/2002 | Needham |
| 2002/0140258 A1 | 10/2002 | Ekern et al. |
| 2002/0145312 A1 | 10/2002 | Gielda et al. |
| 2007/0193279 A1* | 8/2007 | Yoneno et al. ............... 62/3.3 |
| 2007/0214800 A1* | 9/2007 | Kadle et al. ................. 62/3.3 |
| 2007/0234742 A1* | 10/2007 | Aoki et al. .................. 62/3.3 |

* cited by examiner

SYSTEM FOR CONTROLLING CHILD SAFETY SEAT ENVIRONMENT

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to child safety seats. More specifically, the invention is a system that controls the environmental characteristics of temperature and air quality experienced by a child sitting in a child safety seat.

2. Description of the Related Art

Parents today lead increasingly complex and demanding lives. For example, in two parent families, both parents frequently work for a variety of reasons ranging from the need to keep up with cost-of-living increases to the need for both parents to feel fulfilled on a business/professional level. The complexities and demands increase dramatically for single parents whose numbers have increased significantly over the last twenty years. However, along with managing business lives, all parents must also maintain a family life for their children. As a result of all of the above, infants and young children today spend a lot of time being driven around in the family vehicle. Whether it is going to and from daycare, running errands, or just the parent's desire to have their child with them, children today can spend several hours a week in a vehicle. This means that the child is frequently subjected to the confines of their child safety seat which, in some states, is now mandated until the child is six years old.

While child safety seats are designed to reduce the risk of injury in the event of a collision, most rely on a harness to snugly hold the child in the seat at all times. Limiting a child's movement in his seat leads to discomfort as heat builds up between the child and the seat. Furthermore, the relatively small volume of cabin space in a vehicle means that the child is exposed to various pollutants (e.g., dust, pollen, smoke, exhaust, unpleasant odors, etc.) in the vehicle. With a vehicle's open windows or ventilation system operating, the pollutants are easily introduced, circulated and/or trapped within the vehicle's cabin space to which the child is exposed. The pollutants can be noxious or, at the very least, be sufficiently annoying to bring about child discomfort. However, in general, when infants and children experience discomfort, they tend to cry or get fussy. Parents/drivers can become distracted by a child's excessive crying or fussy behavior. As with any distraction, the potential result is a traffic accident.

SUMMARY OF THE INVENTION

Accordingly, it is an object of the present invention to provide a system that can be used with a child safety seat to improve the environment experienced by a child sitting there.

Another object of the present invention is to provide a system that improves vehicular safety by controlling the environment for a child in a child safety seat to thereby keep the child comfortable during vehicular travel.

Other objects and advantages of the present invention will become more obvious hereinafter in the specification and drawings.

In accordance with the present invention, a system is provided to control the environment experienced by a child in a child safety seat. A plurality of thermoelectric elements are coupled to a child safety seat. Each thermoelectric element is individually controllable to be one of heated and cooled relative to an ambient temperature based on a polarity of electrical energy applied thereto. A first portion of the thermoelectric elements are positioned on the child safety seat such that a child sitting therein is positioned thereover. A ventilator coupled to the child safety seat moves air past a second portion of the thermoelectric elements and filters the air moved therepast. Temperature of the filtered air increases when the second portion of the thermoelectric elements is heated. Temperature of the filtered air decreases when the second portion of the thermoelectric elements is cooled. One or more jets coupled to the ventilator receive the filtered air. Each jet is coupled to the child safety seat and can be positioned to direct the heated/cooled filtered air to the vicinity of the head of the child sitting in the child safety seat. A controllable power source, coupled to the child safety seat and electrically coupled to the thermoelectric elements, applies electrical energy of a desired polarity individually to the thermoelectric elements.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

Figure 3:
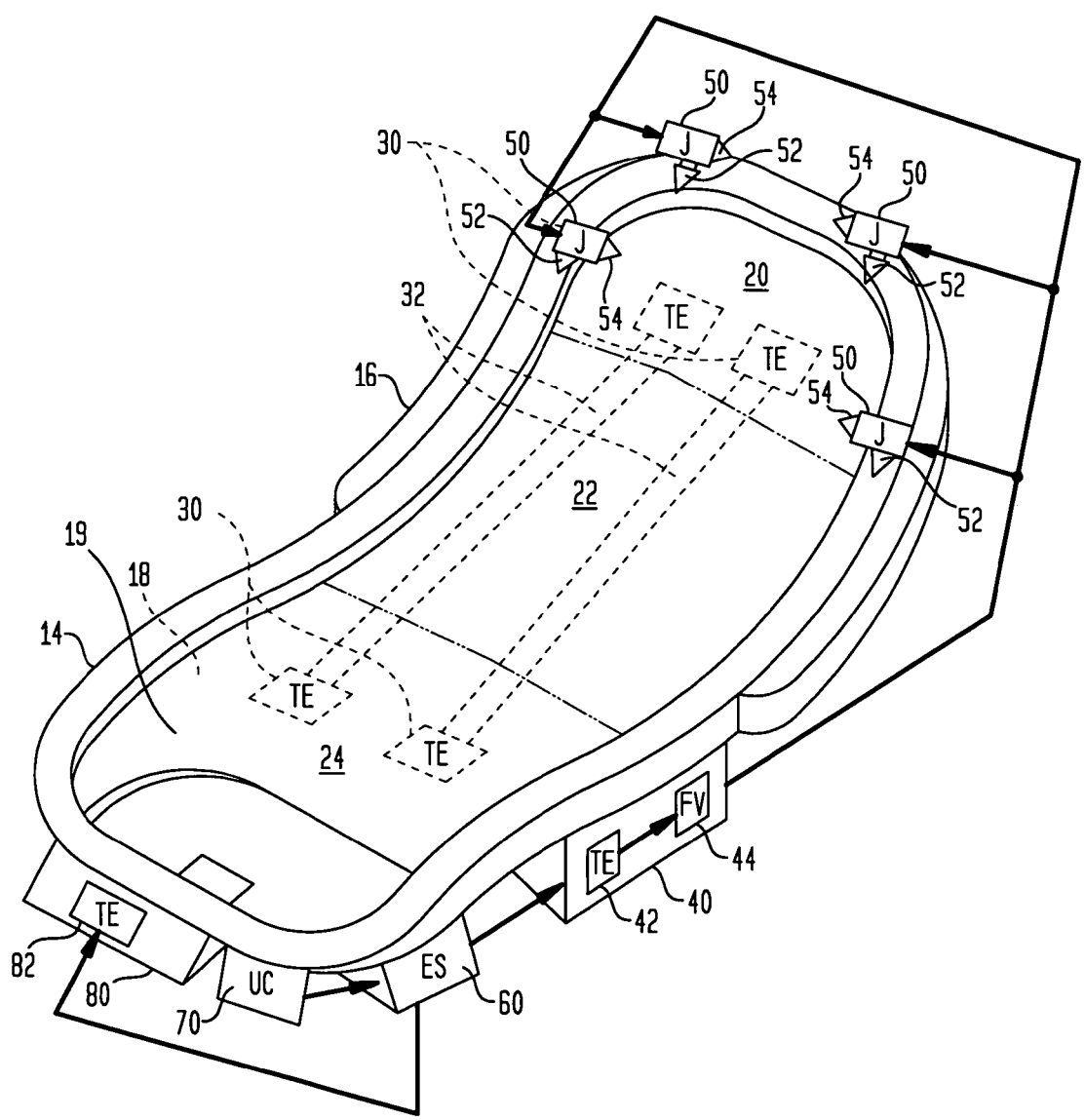
Figure 4:
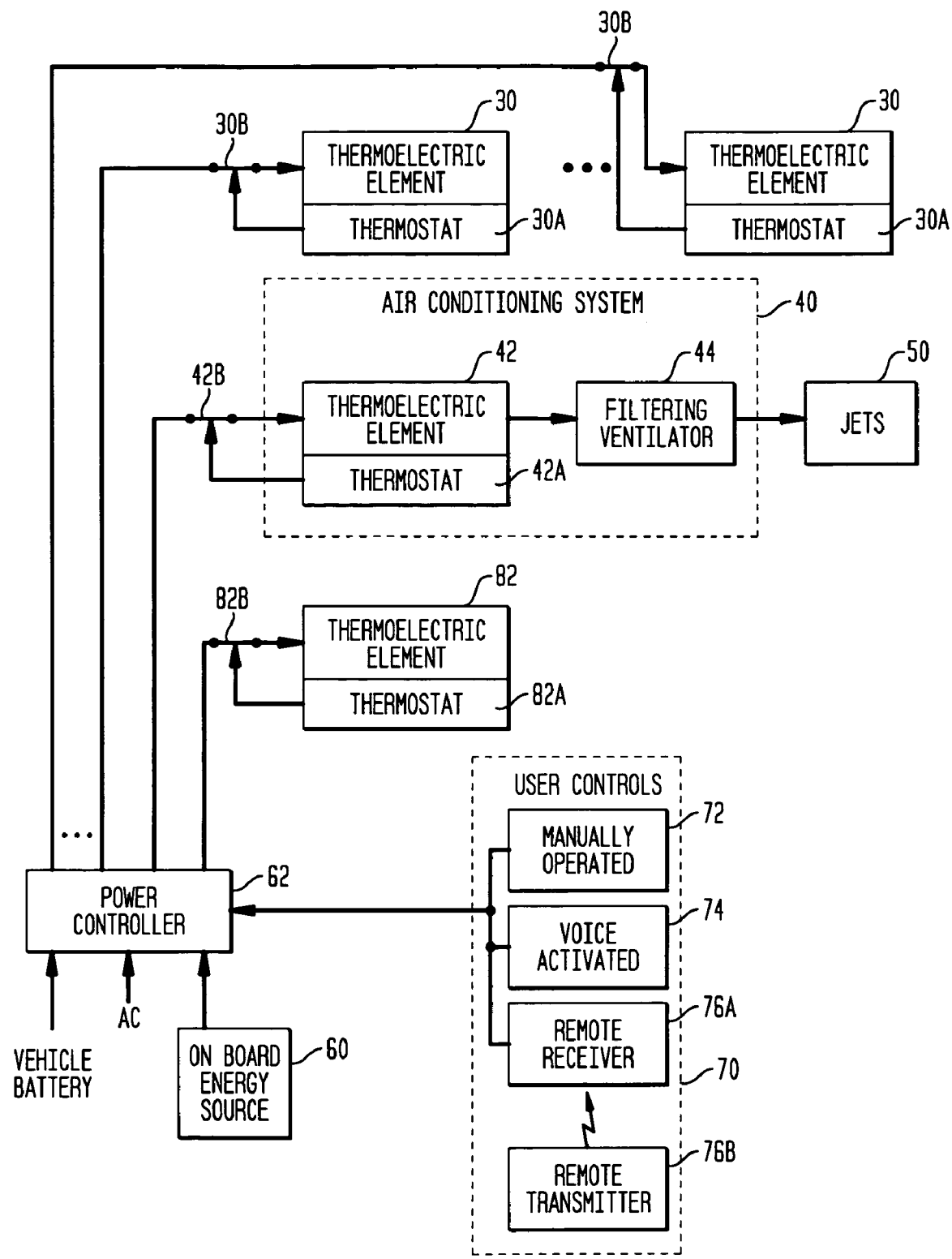

FIG. 3 is an isolated, perspective view of the seat portion of a conventional child safety seat equipped with a system for controlling the temperature and air quality environment for a child in the seat in accordance with another embodiment of the present invention; and FIG. 4 is a schematic view of the system of the present invention illustrating the functional relationships between the elements thereof.

DESCRIPTION OF THE PREFERRED EMBODIMENT(S)

Figure 1:
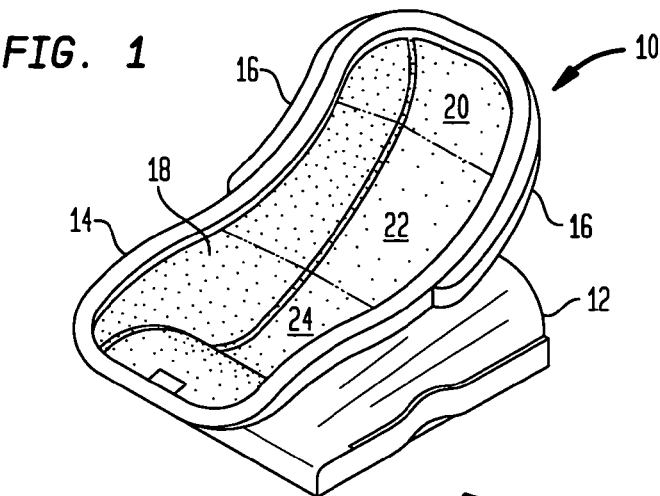
FIG. 1 is a perspective view of a conventional child safety seat.

Referring now to the drawings, and more particularly to FIG. 1, a conventional child safety seat is shown and referenced generally by numeral 10. Child safety seat 10 is representative of a well known child safety seat design having a base 12 that is typically attached to a vehicle's seat by means of a vehicle seat belt (not shown). A removable seat 14 is locked/unlocked to base 12 with the locking and unlocking operation typically controlled by means of a pull down handle 16 shown in its upright (locked) position. Handle 16 is pivoted over seat 14 to unlock same from base 12 and serve as a carrying handle for seat 14. A seat cushion 18 forms the seating surface for the child. A strap or belt-type harness (not shown for clarity of illustration) is typically used to hold the child snugly in seat 14 as is well known in the art. Child safety seat 10 is generally used for newborns and children up to about 2 years old depending on their size and weight. Child safety seat 10 is designed to face rearward in a vehicle for very young children and forward when they are a little older.

It is to be understood that the present invention is in no way limited by the design of child safety seat 10 and that the present invention can be incorporated into any type of child safety seat (e.g., one-piece, two-piece as just described, etc.). However, since parental concerns about a child's welfare are most heightened when the child is very young (i.e., 0 to 2 years old), and since the very young child can be uncontrollably loud or fussy when they are uncomfortable, the description of the present invention will be referenced to child safety seat 10.

For purposes of the present invention, seat 14 is subdivided into three general seating confine regions, namely, a headrest region 20, a back region 22, and a lower body region 24. It is to be understood that the delineations shown between these regions are for purposes of illustration only as the actual locations of a child's body portions are dependent on the child's age, size and body positioning in seat 14.

In general, the present invention controls the temperature of regions 20, 22 and 24, and further controls the temperature and quality of the air in the vicinity of headrest region 20. Since seat 14 is frequently used both in and out of a vehicle, the preferred embodiment of the present invention is a self-contained system that can be operated when seat 14 is coupled to or uncoupled from base 12, i.e., in a vehicle or out of a vehicle.

Figure 2:
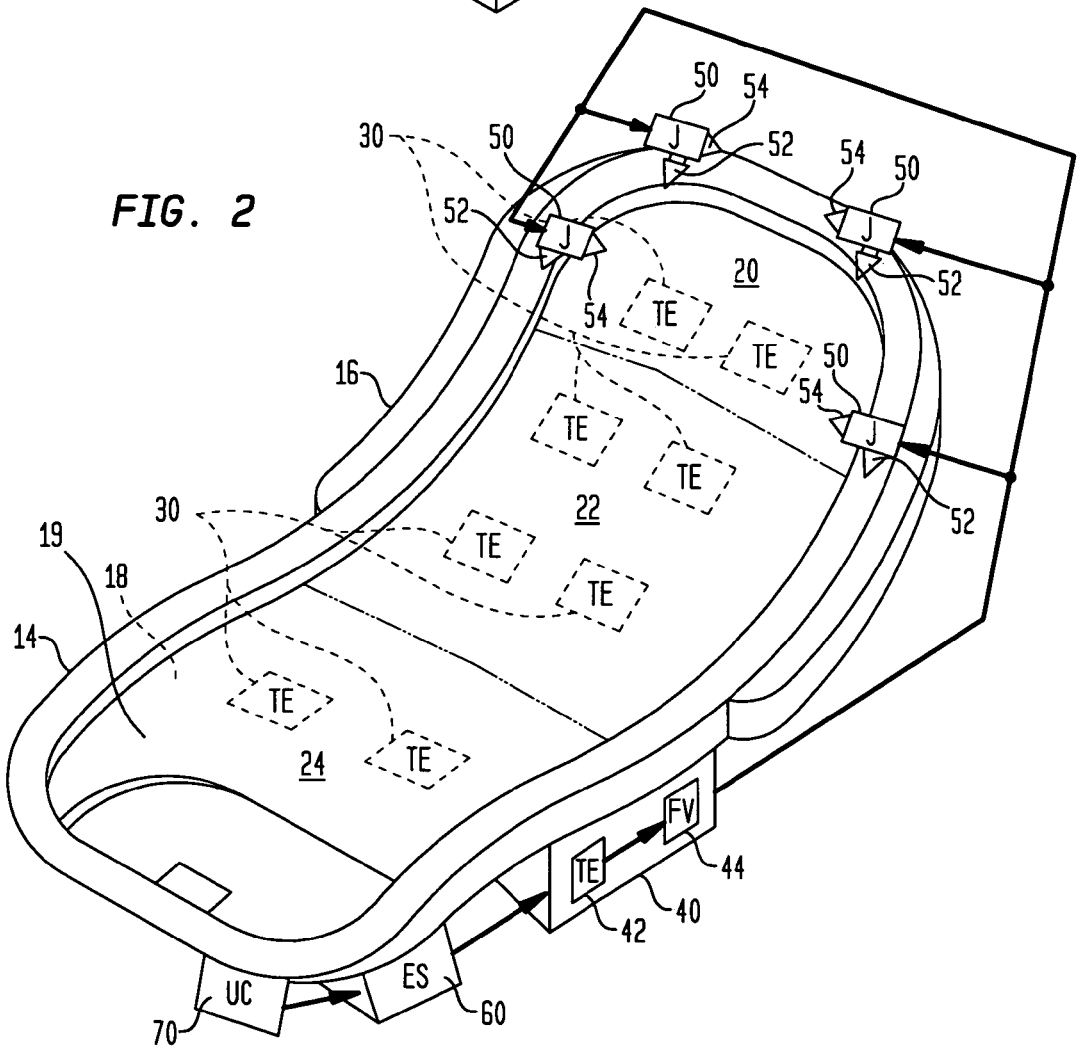
FIG. 2 is an isolated, perspective view of the seat portion of a conventional child safety seat equipped with a system for controlling the temperature and air quality environment for a child in the seat in accordance with an embodiment of the present invention.

Referring additionally now to FIG. 2, a system for controlling the temperature and air quality environment for a child in the seat portion 14 of a child safety seat is shown. If desired, a seat cover 19 made from a moisture wicking material can be used to cover seat cushion 18. This will keep a child dry in the event of a drink spill, leaky diaper, etc. An array of thermoelectric elements ("TE") 30 are positioned underneath seat cushion 18 in the various regions 20-24 of seat 14. Each of thermoelectric elements 30 can be any one of a variety of well known solid-state heat pumps that use the Peltier effect for reversible heating and cooling. Each of elements 30 could be a "flat pack" type of device or could be countersunk in receptacle formed in the body of seat 14. As will be explained further below, each of elements 30 is individually controllable to provide heating or cooling depending on the polarity of the electrical energy applied thereto. In this way, heating or cooling of regions 20-24 can be tailored for a child's specific needs or ambient environmental conditions thereby maximizing the child's thermal comfort. For reasons of safety, each of elements 30 can incorporate a thermostat to regulate and maintain proper heating or cooling levels. In addition, each of elements 30 can incorporate temperature-sensitive limit switches designed to uncouple the thermoelectric element from the electrical energy being applied thereto in the event of extreme hot or cold element temperatures.

Coupled to the back or underside of seat 14 is an air conditioning system 40 that includes one or more individually-controllable thermoelectric elements 42 and a filtering ventilator ("FV") 44. In general, air conditioning system 40 controllably heats/cools an air supply, filters the heated/cooled air, and delivers same to one or more jets ("J") 50 coupled to seat 14 and positioned near or adjacent to headrest region 20 of seat 14. For example, filtering ventilator 44 could be realized by a fan/filter combination that causes fresh air to be passed over element(s) 42 where it is heated/cooled prior to being filtered.

Jets 50 deliver the heated/cooled filtered air to the vicinity of the child's head. In this way, the child's breathable air is conditioned to be virtually free from pollutants. Furthermore, the temperature of the filtered air is regulated to maximize the child's comfort. Each of jets 50 can be mounted on a pivot 52 in order to be directionally adjustable to aim the emitted air stream to a locale suitable for the particular child's breathable air region. Jets 50 can also be equipped with an adjustable nozzle 54 that can be used to adjust the volume of air emitted therefrom. For example, each of jets 50 could be constructed similar to the air jets provided onboard commercial aircraft. In this way, the number of jets 50 that are "on line" at any given time, as well as the volume of heated/cooled filtered air emitted therefrom, can be adjusted by a parent or caregiver to adapt to a child's needs/desires and/or changing ambient conditions.

Power for elements 30 and air conditioner 40 is provided by an onboard energy source ("ES") 60 (e.g., a rechargeable battery) coupled to seat 14. User controls ("UC") 70 (e.g., manually-operated controls, voice-activated controls, remotely-operated controls, etc.) are also provided on seat 14 to control the heating/cooling operation of the system's various thermoelectric elements as will be described further below.

The number of thermoelectric elements 30 used to heat/cool the various regions of seat 14 is not limited to those shown in FIG. 2. For example, many smaller ones of elements 30 could be used to provide a greater degree of temperature control. Another option is to imbed heat pipes 32 in seat 14 and thermally couple them to and between elements 30 as shown in FIG. 3. Heat pipes 32 can be used to passively distribute the heating/cooling effect of elements 30 so that less thermoelectric elements are required.

Additionally or alternatively, seat 14 can incorporate a compartment 80 (e.g., open or closable compartment molded into or attached to seat 14) for holding a drink container (e.g., baby bottle). Compartment 80 houses one or more individually-controllable thermoelectric elements 82 so that a child's drink can be heated/cooled to an appropriate temperature prior to drinking thereby maximizing the child's enjoyment of the drink.

Referring additionally now to FIG. 4, a schematic view of the present invention is illustrated to show the functional relationships between the various elements with like reference numerals being used to refer to those elements that already have been described herein. In addition to having an onboard rechargeable energy source 60, the present invention could be equipped to utilize standard household AC or power from a vehicle's battery. Accordingly, it may be necessary to provide a power controller 62 to operably connect the selected power source to the various thermoelectric elements 30, 42 and 82. The choice of power source and thermoelectric elements to be energized is made via user controls 70 which, as described above, can include one or more of manually-operated controls 72 mounted on seat 14, voice-activated controls 74 mounted on seat 14, and a remote receiver 76A (mounted on seat 14) for receiving instructions transmitted wirelessly from a remote controller 76B.

In operation, a user operates user controls 70 to (i) choose the heating or cooling operation of elements 30, 42 and 82, and (ii) activates filtering ventilator 44. In response to the instructions provided via user controls 70, power controller 62 applies electrical energy of the appropriate polarity to bring about the desired heating and/or cooling effects. As mentioned above, each of thermoelectric elements 30, 42 and 82 can incorporate a thermostat 30A, 42A and 82A, respectively. The output of the thermostats can be coupled to switches 30B, 42B and 82B, each of which is designed to open in the event of an excessive high or low temperature detection by a respective one of the thermostats. In addition, the output from the thermostats could be used to initiate a visual or audible output (e.g., at user controls 70, on a remote display, etc.) that specifies temperature irregularities and/or the taking of a particular thermoelectric element "off line" due to a temperature reading that is outside an acceptable range.

The advantages of the present invention are numerous. A child in a safety seat can now have his thermal and air quality environment regulated. By being able to individually control the system's various thermoelectric elements, a child's thermal environment to include the child's filtered breathing air is controlled for optimum child comfort. As a result, the child will be healthier and happier when in the child safety seat. Furthermore, when the child safety seat is used in a vehicle, the child's comfort translates into general happiness which, in turn, allows a parent/driver of a vehicle to concentrate on driving situations.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for controlling the environment experienced by a child in a child safety seat, comprising:
   first thermoelectric means adapted to be positioned within seating confines of a child safety seat wherein a child sitting in the seating confines is positioned over said first thermoelectric means, said first thermoelectric means controllable to be one of heated and cooled relative to an ambient temperature based on a polarity of electrical energy applied thereto;
   second thermoelectric means adapted to be coupled to the child safety seat and controllable to be one of heated and cooled relative to an ambient temperature based on a polarity of electrical energy applied thereto;
   ventilator means adapted to be coupled to the child safety seat for moving air past said second thermoelectric means and for filtering said air moved therepast, wherein temperature of said air so-filtered is increased when said second thermoelectric means is heated and wherein temperature of said air so-filtered is decreased when said second thermoelectric means is cooled;
   at least one jet coupled to said ventilator means for receiving said air so-filtered, each said jet adapted to be coupled to the child safety seat for directing said air so-filtered to the vicinity of the head of the child sitting in the seating confines of the child safety seat; and
   controllable power means adapted to be coupled to the child safety seat and coupled to said first and second thermoelectric means for applying electrical energy of a desired polarity independently to each of said first thermoelectric means and said second thermoelectric means.

2. A system as in claim 1 wherein said first thermoelectric means comprises a plurality of thermoelectric elements.

3. A system as in claim 1 wherein said first thermoelectric means comprises:
   at least one thermoelectric element; and
   at least one heat pipe thermally coupled to said at least one thermoelectric element.

4. A system as in claim 1 wherein said ventilator means comprises:
   a fan for moving said air past said second thermoelectric means; and
   an air filter positioned to receive said air moving past said second thermoelectric means.

5. A system as in claim 1 wherein each said jet is adjustable with respect to a direction that said air so-filtered is aimed.

6. A system as in claim 1 wherein each said jet is adjustable with respect to a volume of said air so-filtered emitted therefrom.

7. A system as in claim 1 wherein said controllable power means comprises:
   user controls for receiving an instruction indicative of said desired polarity for one of said first thermoelectric means and said second thermoelectric means;
   a power source for supplying said electrical energy; and
   a controller coupled to said user controls, said power source, and each of said first and second thermoelectric means, for applying said electrical energy of said desired polarity to one of said first thermoelectric means and said second thermoelectric means based on said instruction.

8. A system as in claim 7 wherein said user controls comprise at least one of
   (i) manually-operated controls adapted to be mounted on the child safety seat,
   (ii) voice activated controls adapted to be mounted on the child safety seat, and
   (iii) a remote control receiver adapted to be mounted on the child safety seat.

9. A system as in claim 7 wherein said power source is a rechargeable battery adapted to be mounted on the child safety seat.

10. A system as in claim 1 further comprising a wicking material adapted to be coupled to the child safety seat to define an exposed surface of the seating confines.

11. A system for controlling the environment experienced by a child in a child safety seat, comprising:
    a plurality of thermoelectric elements adapted to be coupled to a child safety seat wherein a child sitting therein is positioned over a first portion of said plurality of thermoelectric elements, each of said plurality of thermoelectric elements being individually controllable to be one of heated and cooled relative to an ambient temperature based on a polarity of electrical energy applied thereto;
    ventilator means adapted to be coupled to the child safety seat for moving air past a second portion of said plurality of thermoelectric elements and for filtering said air moved therepast, wherein temperature of said air so-filtered is increased when said second portion is heated and wherein temperature of said air so-filtered is decreased when said second portion is cooled;
    at least one jet coupled to said ventilator means for receiving said air so-filtered, each said jet adapted to be coupled to the child safety seat for directing said air so-filtered to the vicinity of the head of the child sitting in the child safety seat; and
    controllable power means adapted to be coupled to the child safety seat and coupled to said plurality of thermoelectric elements for applying electrical energy of a desired polarity individually thereto.

12. A system as in claim 11 wherein the child safety seat has a compartment formed therein, and wherein a third portion of said plurality of thermoelectric elements is adapted to be positioned in the compartment.

13. A system as in claim 11 wherein said ventilator means comprises:
   a fan for moving said air past said second portion; and
   an air filter positioned to receive said air moving past said second portion.

14. A system as in claim 11 wherein each said jet is adjustable with respect to a direction that said air so-filtered is aimed.

15. A system as in claim 11 wherein each said jet is adjustable with respect to a volume of said air so-filtered emitted therefrom.

16. A system as in claim 11 wherein said controllable power means comprises:
   user controls for receiving an instruction indicative of said desired polarity for at least one of said plurality of thermoelectric elements;
   a power source for supplying said electrical energy; and
   a controller coupled to said user controls, said power source, and each of said plurality of thermoelectric elements, for applying said electrical energy of said desired polarity to said at least one of said plurality of thermoelectric elements based on said instruction.

17. A system as in claim 16 wherein said user controls comprise at least one of
   (i) manually-operated controls adapted to be mounted on the child safety seat,
   (ii) voice activated controls adapted to be mounted on the child safety seat, and
   (iii) a remote control receiver adapted to be mounted on the child safety seat.

18. A system as in claim 16 wherein said power source is a rechargeable battery adapted to be mounted on the child safety seat.

19. A system as in claim 11 further comprising a wicking material adapted to be coupled to the child safety seat to define an exposed surface thereof on which a child may be positioned.

20. A system as in claim 11 further comprising means for removing said electrical energy from each of said plurality of thermoelectric elements having a temperature that is outside an acceptable range of temperatures.

21. A controlled-environment child safety seat, comprising:
   a child safety seat;
   a plurality of thermoelectric elements coupled to said child safety seat wherein a child sitting therein is positioned over a first portion of said plurality of thermoelectric elements, each of said plurality of thermoelectric elements being individually controllable to be one of heated and cooled relative to an ambient temperature based on a polarity of electrical energy applied thereto;
   ventilator means coupled to said child safety seat for moving air past a second portion of said plurality of thermoelectric elements and for filtering said air moved therepast, wherein temperature of said air so-filtered is increased when said second portion is heated and wherein temperature of said air so-filtered is decreased when said second portion is cooled;
   at least one jet coupled to said ventilator means for receiving said air so-filtered, each said jet coupled to said child safety seat for directing said air so-filtered to the vicinity of the head of the child sitting in said child safety seat; and
   controllable power means coupled to said child safety seat and coupled to said plurality of thermoelectric elements for applying electrical energy of a desired polarity individually thereto.

22. A controlled-environment child safety seat as in claim 21 further comprising a compartment formed in said child safety seat, wherein a third portion of said plurality of thermoelectric elements is positioned in said compartment for altering temperature therein.

23. A controlled-environment child safety seat as in claim 21 wherein said ventilator means comprises:
   a fan for moving said air past said second portion; and
   an air filter positioned to receive said air moving past said second portion.

24. A controlled-environment child safety seat as in claim 21 wherein each said jet is adjustable with respect to a direction that said air so-filtered is aimed.

25. A controlled-environment child safety seat as in claim 21 wherein each said jet is adjustable with respect to a volume of said air so-filtered emitted therefrom.

26. A controlled-environment child safety seat as in claim 21 wherein said controllable power means comprises:
   user controls for receiving an instruction indicative of said desired polarity for at least one of said plurality of thermoelectric elements;
   a power source for supplying said electrical energy; and
   a controller coupled to said user controls, said power source, and each of said plurality of thermoelectric elements, for applying said electrical energy of said desired polarity to said at least one of said plurality of thermoelectric elements based on said instruction.

27. A controlled-environment child safety seat as in claim 26 wherein said user controls comprise at least one of
   (i) manually-operated controls mounted on said child safety seat,
   (ii) voice activated controls mounted on said child safety seat, and
   (iii) a remote control receiver mounted on said child safety seat.

28. A controlled-environment child safety seat as in claim 26 wherein said power source is a rechargeable battery mounted on said child safety seat.

29. A controlled-environment child safety seat as in claim 21 further comprising a wicking material coupled to said child safety seat to define an exposed surface thereof on which a child may be positioned.

30. A controlled-environment safety seat as in claim 21 further comprising means for removing said electrical energy from each of said plurality of thermoelectric elements having a temperature that is outside an acceptable range of temperatures.

* * * * *